UNITED STATES PATENT OFFICE.

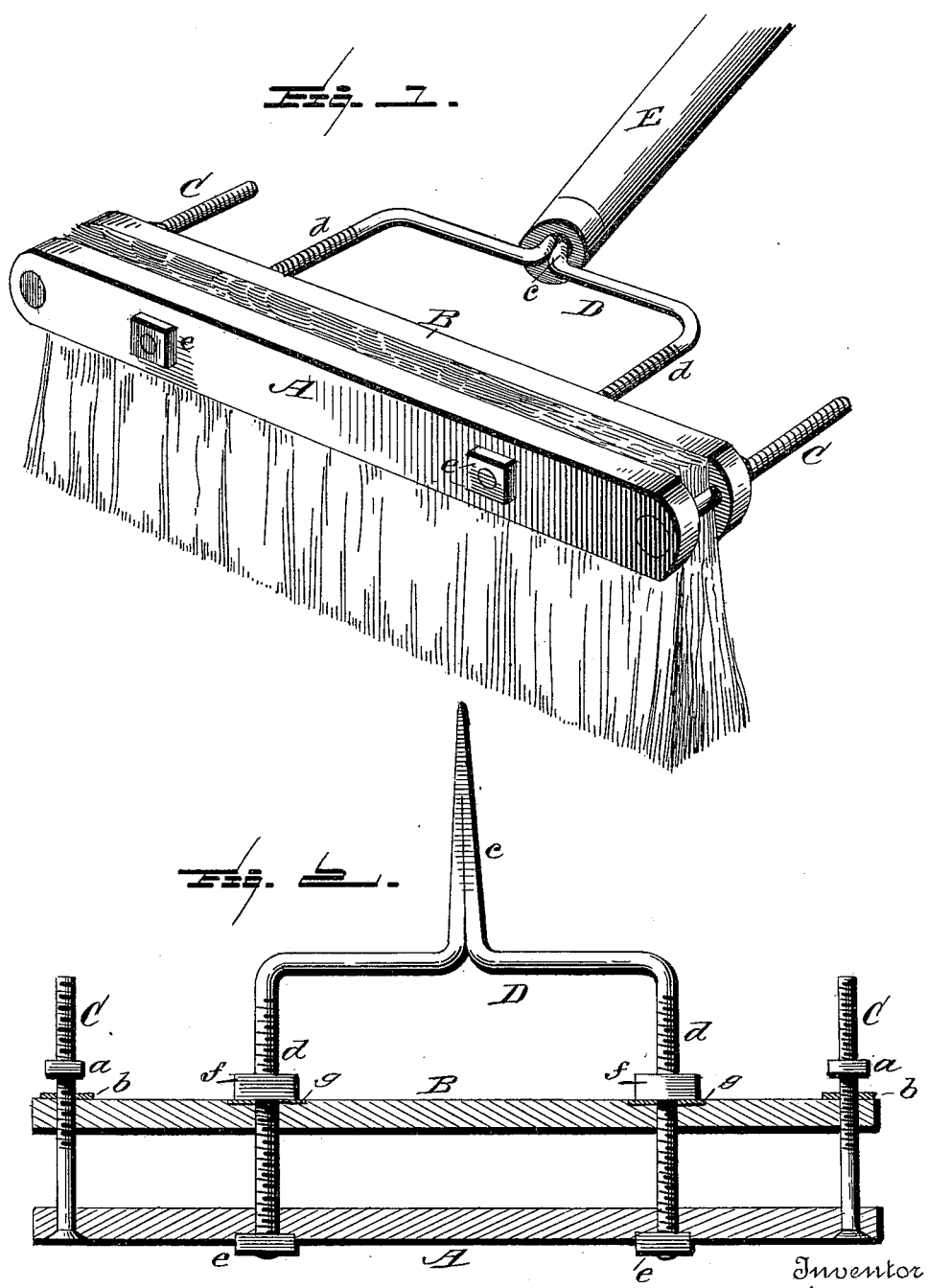

WILLIAM S. HARPER, OF BRAXTON, MISSISSIPPI.

MOP-HEAD.

SPECIFICATION forming part of Letters Patent No. 634,138, dated October 3, 1899.

Application filed July 21, 1899. Serial No. 724,648. (No model.)

*To all whom it may concern:*

Be it known that I, WILLIAM S. HARPER, a citizen of the United States, residing at Braxton, in the county of Simpson and State of Mississippi, have invented certain new and useful Improvements in Mop-Heads; and I do hereby declare that the following is a full, clear, and exact description of the same, reference being had to the annexed drawings, making a part of this specification, and to the letters of reference marked thereon.

The present invention has for its object to provide a simple, strong, and durable mop-head and one that will be inexpensive to manufacture and capable of use in receiving and securely holding corn-husks, cloth, or other suitable material adapted for use as a mop; and the invention consists in a mop-head constructed substantially as shown in the drawings and hereinafter described and claimed.

Figure 1 of the drawings is a perspective view of a mop-head constructed in accordance with my invention, and Fig. 2 a horizontal section thereof with the handle and mop material removed.

In the accompanying drawings, A B represent the two parallel clamping-bars, which may be of wood or metal, as found most preferable, and between which the material forming the mop is held. The clamping-bar A has at each end thereof a screw-threaded guide-rod C to receive screw-threaded nuts $a$, which engage the threads on the rods. The rods extend loosely through holes in the clamping-bar B, and upon the outer side of the bar are metal washers $b$, against which the nuts bear. A U-shaped frame D terminates in a shank $c$ for connecting thereto a suitable handle E, said frame having its parallel arms $d$ screw-threaded to receive screw-threaded nuts $e\ f$. This frame is constructed of wire of the desired thickness and forms a brace for the mop-head, the screw-threaded arms thereof extending loosely through holes in the clamping-bars A B. The nuts $e\ f$ extend or are located upon the outer sides of both the clamping-bars and serve to draw the bars together against the mop between them to clamp and hold it firmly in place.

After the material of which the mop is composed is placed between the clamping-bars A B the nuts $e\ f$ are screwed up against the sides of the bars, which will force them tightly against the material of the mop, and by screwing up the nuts $a$ upon the rods C the extremities of the clamping-bars will be brought firmly against the material of the mop and hold it against spreading or working loose and dropping out at the ends of the clamping-bars. This is considered of importance where corn-husks are used or broom-corn is employed.

The rods C serve a double function in that the rods provide guides for the clamping-bar B when the same is being forced up against the mop by the nuts $e\ f$ and also to clamp the extremities of the bars against the mop and prevent them from springing outward.

If desired, suitable washers $g$ may be used for the nuts $f$ to bear against when screwing the nuts up against the washers.

Having now fully described my invention, what I claim as new, and desire to secure by Letters Patent, is—

A mop-head comprising two parallel clamping-bars, screw-threaded guide-rods and nuts at the extremities of the bars, and a U-shaped wire frame having parallel screw-threaded arms extending through holes in both the bars and having clamping-nuts thereon, said frame terminating in a shank for the attachment of a suitable handle, substantially as and for the purpose set forth.

In testimony that I claim the above I have hereunto subscribed my name in the presence of two witnesses.

WILLIAM S. HARPER.

Witnesses:
 H. P. HARPER,
 W. G. BELL.